United States Patent Office 3,052,516
Patented Sept. 4, 1962

3,052,516
PROCESS FOR RECOVERING TUNGSTEN VALUES FROM SOLUTION
James L. Drobnick, Golden, and Clifford J. Lewis, Lakewood, Colo., assignors to General Mills, Inc., a corporation of Delaware
No Drawing. Filed Feb. 10, 1959, Ser. No. 792,267
5 Claims. (Cl. 23—51)

This invention relates to the preparation of ammonium para-tungstate and in particular to the preparation of the ammonium para-tungstate from tungsten-pregnant aqueous solutions encountered in the treatment of tungsten ores.

In the preparation of tungsten oxide in the tungsten industry at one point in the process the tungsten is crystallized as ammonium para-tungstate. Present practice is to crystallize ammonium para-tungstate from aqueous solutions by a process of slow crystallization which, however, produces low yields and requires high recycle load of aqueous ammonium para-tungstate. Much evaporation is necessary in order to obtain sufficient tungsten concentration to crystallize the ammonium para-tungstate. Impurities such as molybdenum are frequently occluded or otherwise entrapped in the ammonium para-tungstate precipitate.

It has now been found that a tungsten-pregnant aqueous solution having a pH value on the acid side can be contacted with an amine extractant so that the tungsten and some other impurities will thereupon enter the organic phase. The organic phase is then separated from the aqueous phase by virtue of the immiscibility of the two phases. The tungsten-pregnant organic phase is contacted with an aqueous solution of ammonia whereupon the tungsten is stripped from the amine phase while simultaneously being precipitated as ammonium para-tungstate. The ammonium para-tungstate precipitate is in a form which may readily be recovered by filtration. The molybdenum which follows the tungsten into the amine phase is likewise stripped by the aqueous ammonia solution but does not precipitate and may therefore be either discarded in the aqueous filtrate resulting from filtering the ammonium para-tungstate precipitate or recovered therefrom. As ammonium para-tungstate is somewhat soluble in the stripping solution some ammonium para-tungstate will be present in the aqueous filtrate. If no appreciable molybdenum is present the stripping solution may simply be recycled with the addition of sufficient ammonia to compensate for the ammonia consumed by the precipitated ammonium para-tungstate. If molybdenum is appreciable but not substantial the stripping solution may be recycled but a bleed stream may be employed to discard the molybdenum at the same rate it is reporting into the recycled stripping solution. If the amount of molybdenum present is so great as to render the bleed stream impractical the entire batch of aqueous filtrate must be discarded and a new stripping solution used. The rejected solution may however be acidified to precipitate a tungstic acid containing some molybdenum which may find use where molybdenum tolerance is more lenient.

This invention, therefore, permits an immediate further purification of the tungsten due to the selectivity of the amine reagent during the extraction stage. The discovery makes it possible to precipitate ammonium para-tungstate rapidly without need for evaporation because of the complete control possible with regard to the concentration of ammonia in the aqueous stripping solution. Because the precipitation rate is under complete control the physical and chemical characteristics of the ammonium para-tungstate precipitate are subject to positive control. Finally impurities, particularly molybdenum, which are normally entrapped in the ammonium para-tungstate precipitate, are practically eliminated due to the solubility of ammonium molybdate.

It is therefore an object of this invention to provide a method of preparing ammonium para-tungstate.

It is also an object of this invention to provide a method of preparing ammonium para-tungstate virtually free from molybdenum impurities.

Other objects and advantages will be apparent from the following description.

In general, the present process deals with the amine extraction of tungsten from aqueous tungsten-pregnant solutions having an acid pH, and the subsequent stripping of the tungsten from the amine extract by use of an aqueous ammonia solution whereby the tungsten is precipitated as ammonium para-tungstate while any molybdenum present is also stripped but remains in solution as ammonium molybdate.

The tungsten-pregnant solutions useful in this invention are those encountered in conventional treatment of tungsten ores. In general there are two types of treatment employed in the tungsten industry, namely, the basic type and acid type. In both, a strong mineral acid is used at some point in the process resulting in the formation of tungstic acid.

In one of the conventional basic type treatments wolframite or very low molybdenum ores are dissolved with NaOH. The sludge is then filtered off and to the resulting filtrate containing sodium tungstate is added calcium chloride so as to precipitate calcium tungstate. A strong mineral acid such as hydrochloric acid is then added to produce tungstic acid. It is at this point that the present invention can be used.

The Shoppler process is another basic type treatment in which scheelite is the usual feed. It is quite similar in many respects to the process described and also utilizes hydrochloric acid which is added to a sodium tungstate solution.

In the acid type treatment scheelite is the usual feed although the process has also been operated using hubnerite. In this type of treatment the ore is treated directly with a strong mineral acid to form a tungsten-pregnant solution.

The acidic tungsten-pregnant aqueous solution described in any of the aforementioned conventional processes can be employed in the present invention.

Various amine extractants which are capable of extracting tungsten from an acid liquor may be employed in the present invention. These amines are generally aliphatic in character although they may be partially aromatic. In general, the amines are either secondary or tertiary amines. The preferred amines are the secondary or tertiary amines containing aliphatic hydrocarbon groups of from approximately 8 to approximately 22 carbon atoms. These aliphatic hydrocarbon groups may be straight chain saturated or unsaturated. In place of these straight chain aliphatic hydrocarbon groups the amine may contain highly branched chain aliphatic hydrocarbon groups, which are principally derived from olefinic sources. In addition it is possible to use amines containing one or more branched chain alkyl groups and/or one or more straight chain alkyl groups. Typical amines which may be used for this purpose are the following:

(1) 

in which $R_1$ is an aliphatic hydrocarbon group having a tertiary carbon atom at the point at which it is attached to the nitrogen atom. The substituents attached to this tertiary carbon atom are alkyl groups totaling from 11 to 14 carbon atoms in the three alkyl groups. $R_2$ is a $C_{12}H_{25}$ group. A product of this type is available on the market and is sold as Amberlite LA2.

(2) 

in which $R_1$ is as above described and $R_3$ is the group

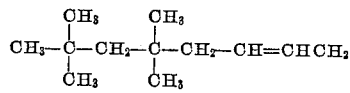

A product of this type is available on the market and is sold as Amberlite LA 1.

(3) Tri-isooctyl amine.

(4) The compound bis (1-isobutyl-3,5-dimethyl hexyl)-amine having the formula

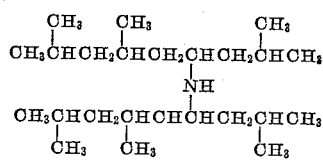

(5) Di(3,5,7-trimethyloctyl) amine having the formula

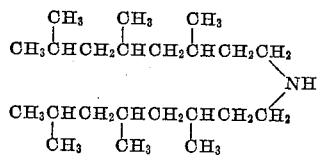

(6) 6-benzylamino-3,9 diethyltridecane having the formula

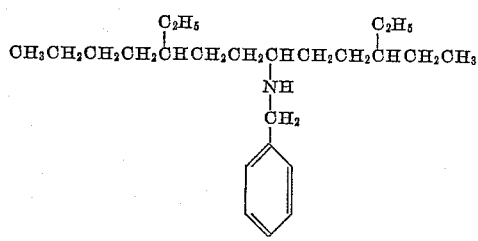

(7) 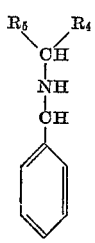

in which $R_4$ and $R_5$ are alkyl groups containing from 7 to 11 carbon atoms.

The amines described are generally dissolved in a suitable organic solvent prior to their use. Illustrative of the common solvents which may be used are diisobutyl ketone and ethyl hexanol. Ordinary kerosene may also be used.

In general, the tungsten-pregnant aqueous solution having an acid pH is contacted with the dissolved amine extractant. The extraction is carried out in a continuous, counter-current, liquid-liquid extraction circuit. The tungsten and some of the other impurities thereupon enter the organic phase which is then separated from the tungsten barren aqueous phase by virtue of the immiscibility of the two phases. The tungsten-pregnant organic phase is contacted with an aqueous solution of ammonia, whereupon the tungsten is stripped from the amine phase while simultaneously being precipitated as ammonium para-tungstate. The amine phase is simultaneously regenerated for recycle to the extraction operation. The stripping is carried out so as to allow a long phase disengagement period. The ammonium para-tungstate precipitate is in a highly desirable crystalline form which can then be recovered by filtration. Molybdenum which follows the tungsten into the amine phase is likewise stripped but does not precipitate and may be discarded in the aqueous filtrate or recovery of the molybdenum may be undertaken.

The stripping solution employed in this invention can be prepared by dilution of a 29% ammonia solution. The pH of the aqueous ammonia stripping solution can be varied over a range of about 7 to 14, although the optimum pH is about 10.0.

The following example will serve to better illustrate the present invention.

EXAMPLE I

The aqueous tungsten-pregnant solution used had the following analysis:

140 grams tungsten per liter
3.3 grams molybdenum per liter
pH: 1.8 with $H_2SO_4$ The amine employed was a tertiary alkyl amine in which the alkyl groups were straight chain hydrocarbon groups containing principally 8 and 10 carbon atoms with a minimum amount of 12 carbon atom alkyl groups. On a weight basis the amine reagent was composed of 10% amine, 20% diisobutyl ketone and 20% ethyl hexanol the remained being kerosene. The solvent was then loaded to capacity by mixing it with the tungsten-pregnant aqueous solution. The aqueous phase was then separated from the organic phase. The organic phase was then stripped in a long tower settling unit using an aqueous ammonia stripping solution. The ammonium para-tungstate was then filtered, ignited at 200° C., and analyzed for molybdenum by a butyl acetate-thiocyanate colorimetric method.

The following table will serve to illustrate the results of several runs.

*Table I*

| Run | Flow Rates, cc./Min. | | | Percent $NH_3$ in Strip Solution | Percent Mo in Tungsten Concentrate |
|---|---|---|---|---|---|
| | Solvent | Aqueous | Strip | | |
| 1 | 30 | 5 | 8 | 29 | 0.06 |
| 2 | 22 | 4 | 4 | 14 | 0.09 |
| 3 | 22 | 4 | 4 | 7 | 0.32 |
| 4 | 21 | 4 | 4 | 4.8 | 0.38 |
| 5 | 21 | 4 | 10 | 29 | 0.18 |

It is, therefore, apparent that the technique just described provides a preferred way for preparing ammonium para-tungstate as well as a desirable way for reducing the molybdenum content of a tungstate product when and if molybdenum is present.

Having thus described our invention, we therefore claim:

1. A process for recovering tungsten from aqueous solutions containing tungsten and molybdenum values comprising extracting both the tungsten and molybdenum values from said aqueous solution by contacting said aqueous solution with an amine extractant selected from the group consisting of secondary and tertiary amines containing at least one aliphatic hydrocarbon group having from 8 to 22 carbon atoms, subsequently stripping both the tungsten and molybdenum values from said amine extractant with an aqueous ammonia solution thereby precipitating the tungsten as ammonium para-tungstate and separating the precipitate from the aqueous stripping solution, which solution contains the molybdenum values.

2. A process as defined in claim 1 in which said amine extractant is a secondary amine containing two aliphatic hydrocarbon groups, each having from 8 to 22 carbon atoms.

3. A process as defined in claim 1 in which said amine extractant is a tertiary amine containing three aliphatic hydrocarbon groups, each having from 8 to 22 carbon atoms.

4. A process as defined in claim 1 in which said amine extractant is a tertiary amine containing three aliphatic hydrocarbon groups, each having from 8 to 12 carbon atoms.

5. A process as defined in claim 1 in which said aqueous ammonia solution has a pH of about 10.0.

References Cited in the file of this patent

UNITED STATES PATENTS

| 2,202,525 | Hixon et al. | May 28, 1940 |
| 2,211,119 | Hixon et al. | Aug. 13, 1940 |
| 2,703,789 | McKinley et al. | Mar. 8, 1953 |
| 2,802,718 | Zotos | Aug. 13, 1957 |
| 2,870,207 | Niederhauser et al. | Jan. 20, 1959 |
| 2,877,250 | Brown et al. | Mar. 10, 1959 |
| 2,894,814 | Loung | July 14, 1959 |
| 2,955,932 | Goren | Oct. 11, 1960 |
| 2,963,342 | Pilloton et al. | Dec. 6, 1960 |
| 2,963,343 | Pilolton et al. | Dec. 6, 1960 |

FOREIGN PATENTS

| 347,074 | Great Britain | Apr. 23, 1931 |

OTHER REFERENCES

McPherson and Henderson's book, "A Course in General Chemistry," Third Ed., Ginn and Co., N.Y., pp. 663–666.

J. W. Mellor's "Comprehensive Treatise on Inorganic and Theoretical Chemistry," vol. 11, 1931, pp. 812, 813. Longmans, Green and Co., N.Y.

Werning et al. in "Industrial and Engineering Chemistry," vol. 46, No. 4, pages 644 to 652 (pages 648 and 649 particularly relied on).